US011342597B2

(12) United States Patent
Roh et al.

(10) Patent No.: US 11,342,597 B2
(45) Date of Patent: *May 24, 2022

(54) BATTERY PACK INCLUDING NOISE REDUCTION MEMBER

(71) Applicant: LG CHEM, LTD., Seoul (KR)

(72) Inventors: Tae Hwan Roh, Daejeon (KR); Tae Hyuck Kim, Daejeon (KR); Yoonhee Lee, Daejeon (KR); Jin Kyu Lee, Daejeon (KR); Junhee Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 149 days.

This patent is subject to a terminal disclaimer.

(21) Appl. No.: 16/406,782

(22) Filed: May 8, 2019

(65) Prior Publication Data

US 2019/0267676 A1  Aug. 29, 2019

Related U.S. Application Data

(63) Continuation of application No. 15/304,288, filed as application No. PCT/KR2015/004614 on May 8, 2015, now Pat. No. 10,326,175.

(30) Foreign Application Priority Data

May 8, 2014  (KR) .......................... 10-2014-0054569

(51) Int. Cl.
*H01M 10/42* (2006.01)
*H01M 10/48* (2006.01)
(Continued)

(52) U.S. Cl.
CPC ..... *H01M 10/4264* (2013.01); *H01M 10/052* (2013.01); *H01M 10/0525* (2013.01);
(Continued)

(58) Field of Classification Search
CPC ......... H01M 10/0525; H01M 10/4264; H01M 10/4257; H01M 10/482; H01M 2/1061; H01M 2/1077; H01M 2/204–305
See application file for complete search history.

(56) References Cited

U.S. PATENT DOCUMENTS

2003/0027044 A1* 2/2003 Asahina ............. H01M 50/528
429/179
2008/0050645 A1  2/2008 Kai et al.
(Continued)

FOREIGN PATENT DOCUMENTS

CN  102769313 A  11/2012
EP  2 362 463 A2  8/2011
(Continued)

OTHER PUBLICATIONS

International Search Report, issued in PCT/KR2015/004614, dated Aug. 13, 2015.

*Primary Examiner* — Osei K Amponsah
(74) *Attorney, Agent, or Firm* — Birch, Stewart, Kolasch & Birch, LLP

(57) ABSTRACT

Disclosed herein is A battery pack comprising: a pack housing; a base plate; at least two battery modules arranged such that the battery modules are located in a space defined between the pack housing and the base plate, each battery module including a plurality of battery cells or unit modules which can be charged and discharged; a first wall located at a first side of the base plate; a second wall located at a second side of the base plate; an external input terminal and an external output terminal are located at both of the first wall and the second wall, the battery modules being connected to the external input and output terminals in a state in which the battery modules are electrically connected in series or in parallel to each other; and a capacitor is present at the first or second wall adjacent to a corresponding one of (Continued)

the external input and output terminals, the capacitor being electrically connected to said corresponding one of the external input and output terminals.

21 Claims, 6 Drawing Sheets

(51) Int. Cl.
| | |
|---|---|
| *H01M 10/052* | (2010.01) |
| *H01M 10/0525* | (2010.01) |
| *H01M 50/10* | (2021.01) |
| *H01M 50/20* | (2021.01) |
| *H01M 50/116* | (2021.01) |
| *H01M 50/124* | (2021.01) |
| *H01M 50/209* | (2021.01) |
| *H01M 50/502* | (2021.01) |
| *H01M 50/543* | (2021.01) |

(52) U.S. Cl.
CPC ..... *H01M 10/4257* (2013.01); *H01M 10/482* (2013.01); *H01M 50/10* (2021.01); *H01M 50/116* (2021.01); *H01M 50/124* (2021.01); *H01M 50/20* (2021.01); *H01M 50/209* (2021.01); *H01M 50/502* (2021.01); *H01M 50/543* (2021.01); *H01M 2010/4271* (2013.01); *H01M 2010/4278* (2013.01); *H01M 2220/20* (2013.01); *H01M 2220/30* (2013.01); *Y02E 60/10* (2013.01); *Y02T 10/70* (2013.01)

(56) References Cited

U.S. PATENT DOCUMENTS

| | | |
|---|---|---|
| 2008/0284375 A1 | 11/2008 | Nagaoka et al. |
| 2010/0001737 A1 | 1/2010 | Kubo et al. |
| 2010/0116570 A1 | 5/2010 | Sugawara et al. |
| 2011/0111649 A1 | 5/2011 | Garascia et al. |
| 2011/0189525 A1 | 8/2011 | Palanchon et al. |
| 2011/0234162 A1 | 9/2011 | Kinoshita et al. |
| 2011/0293973 A1* | 12/2011 | Kim .................. H01M 50/147 429/53 |
| 2012/0052345 A1 | 3/2012 | Kai et al. |
| 2014/0234691 A1 | 8/2014 | Lee et al. |

FOREIGN PATENT DOCUMENTS

| | | |
|---|---|---|
| JP | 2001-23700 A | 1/2001 |
| JP | 2006-185894 A | 7/2006 |
| JP | 2006-345606 A | 12/2006 |
| JP | 2007-226996 A | 9/2007 |
| JP | 2008-35671 A | 2/2008 |
| JP | 2010-113999 A | 5/2010 |
| JP | 2011-217606 A | 10/2011 |
| KR | 10-1165530 B1 | 7/2012 |
| KR | 10-2012-0085527 A | 8/2012 |
| KR | 10-2012-0125328 A | 11/2012 |
| KR | 10-2013-0015353 A | 2/2013 |
| KR | 10-2013-0086678 A | 8/2013 |
| KR | 10-2013-0123981 A | 11/2013 |
| KR | 10-2013-0124641 A | 11/2013 |

* cited by examiner

[FIG. 1]
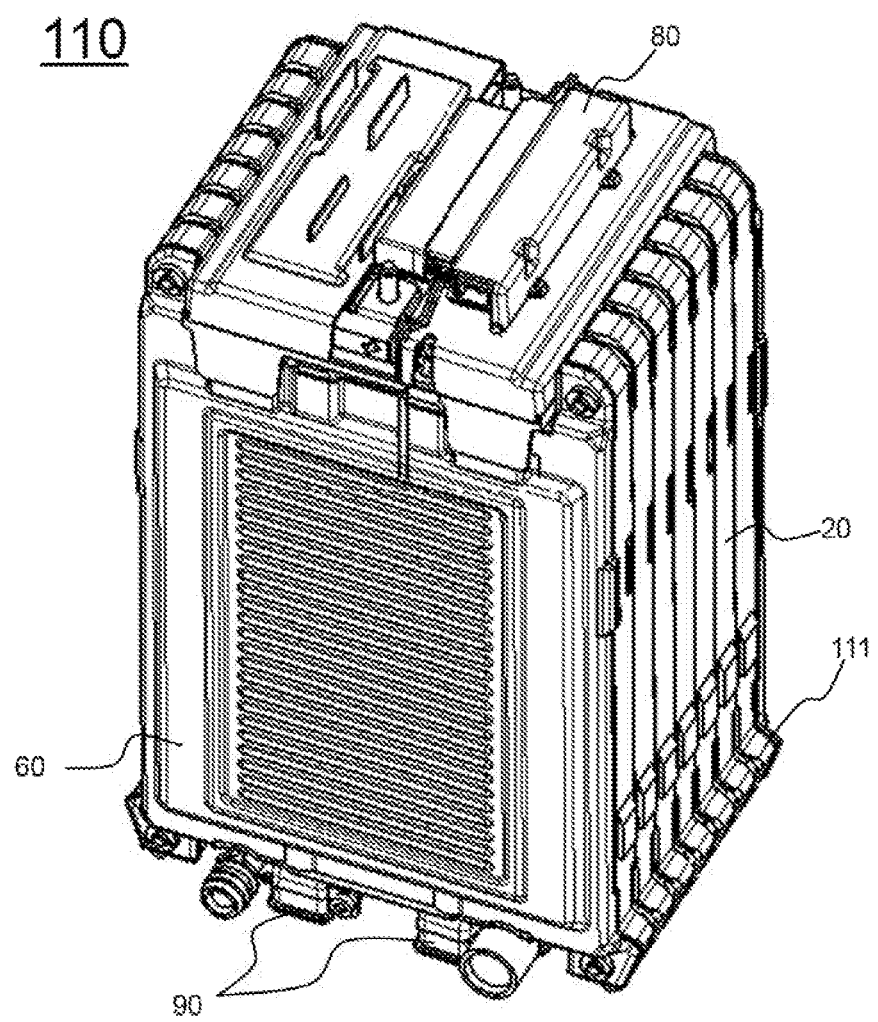

[FIG. 2]
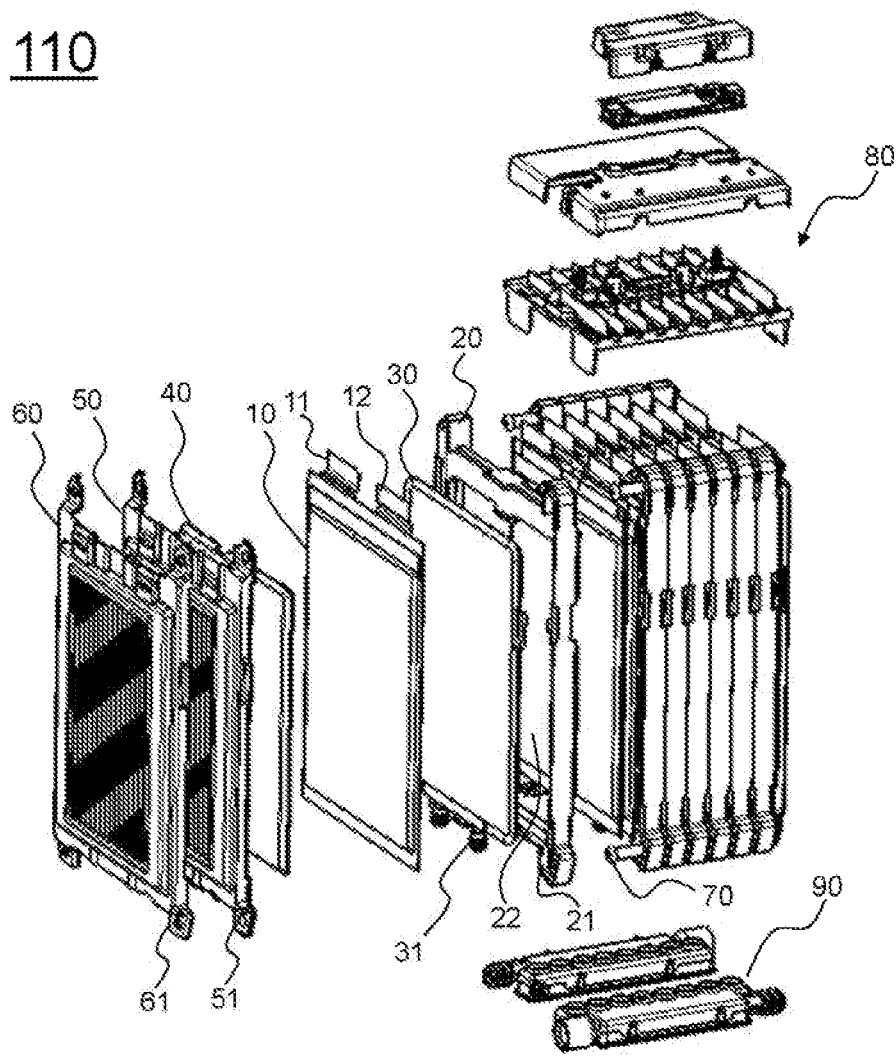

【FIG. 3】
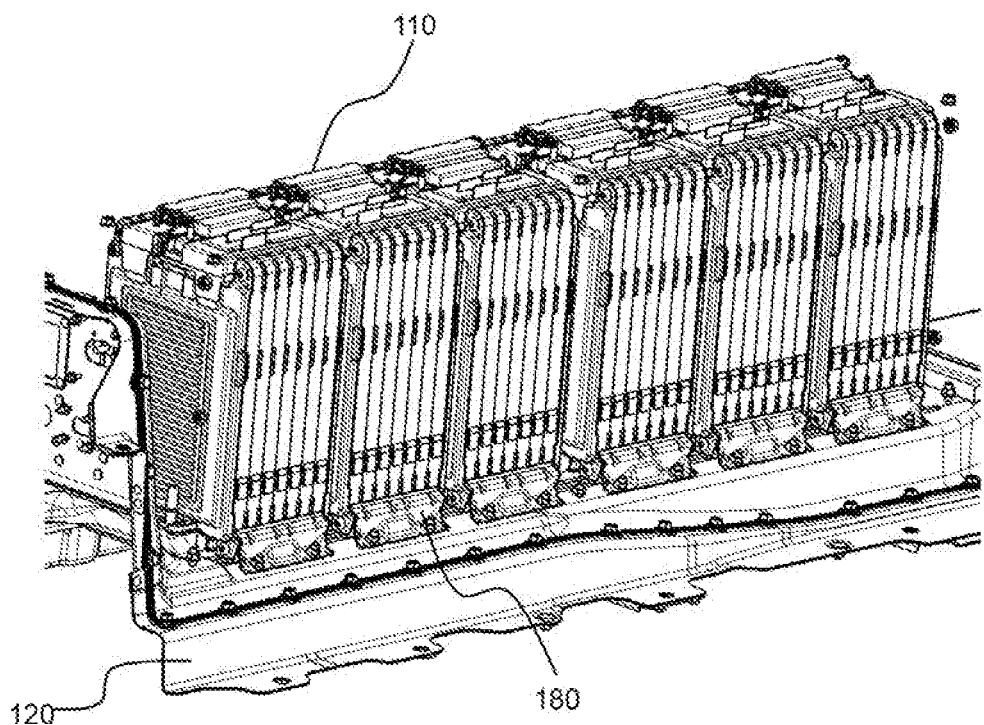
【FIG. 4】
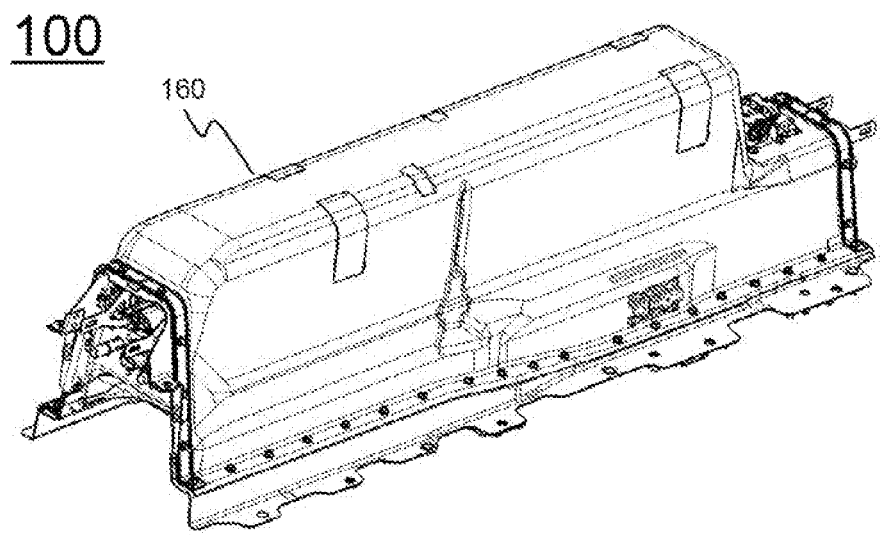

[FIG. 5]
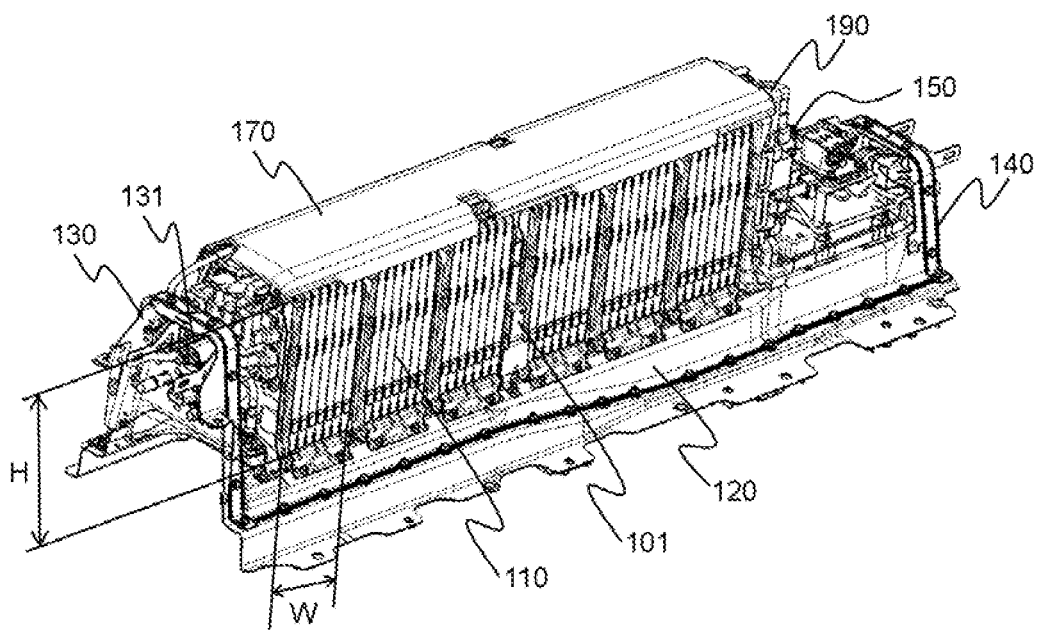
[FIG. 6]
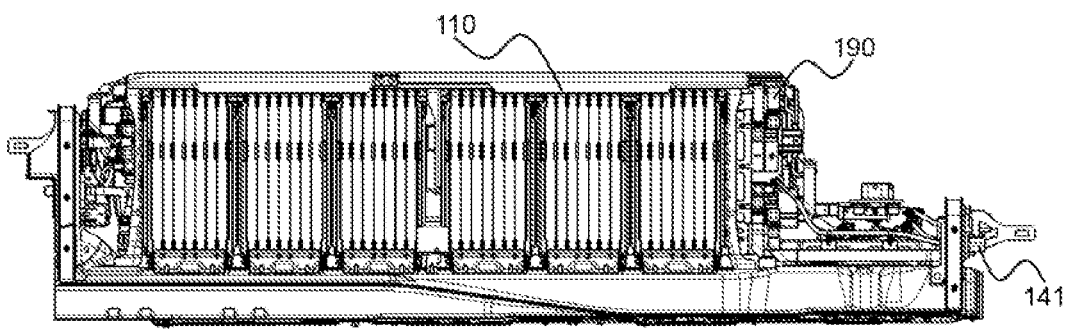

[FIG. 7]
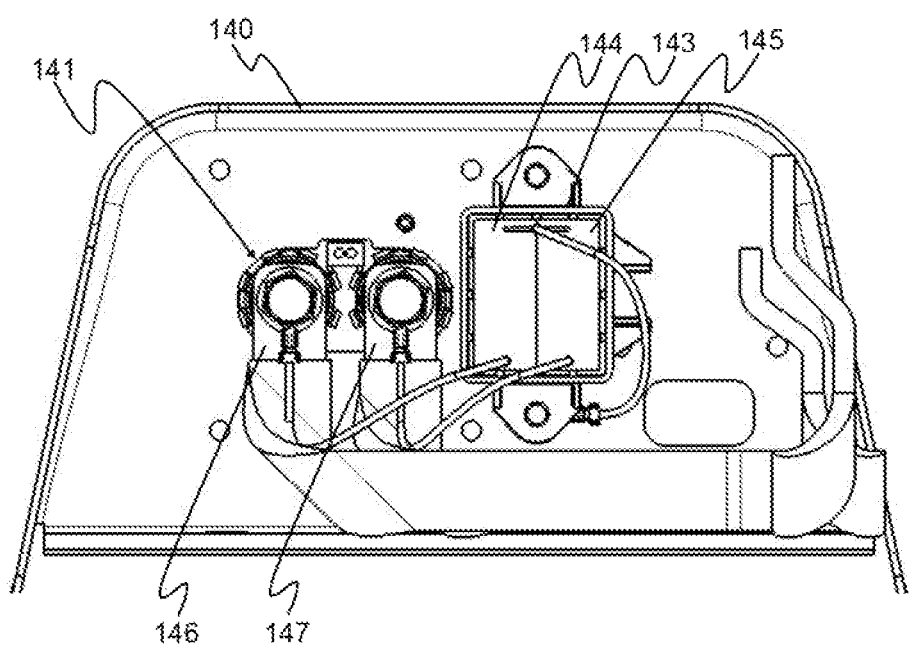

【FIG. 8】
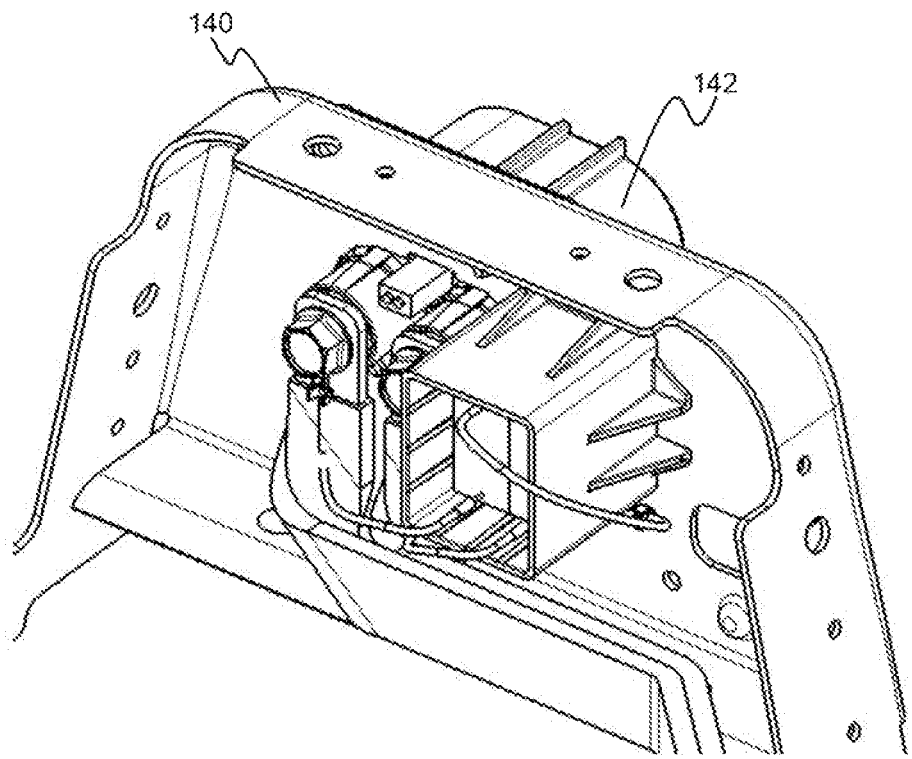
【FIG. 9】
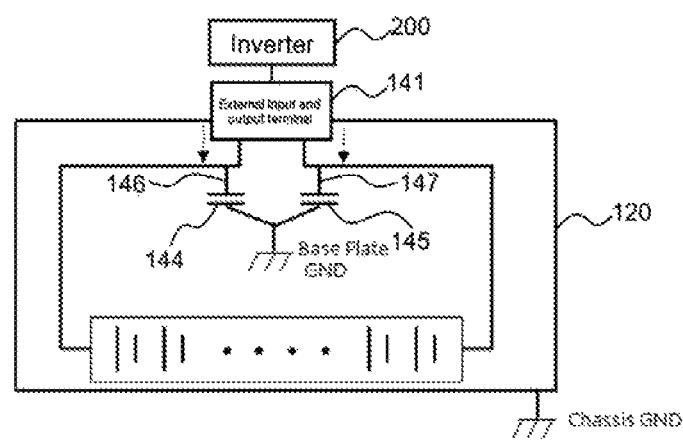

BATTERY PACK INCLUDING NOISE REDUCTION MEMBER

CROSS REFERENCE TO RELATED APPLICATIONS

This application is a Continuation of copending application Ser. No. 15/304,288, filed on Oct. 14, 2016, which was filed as a National Phase of PCT International Application No. PCT/KR2015/004614 on May 8, 2015, which claims the benefit under 35 U.S.C. § 119(a) to Patent Application No. 10-2014-0054569, filed in the Republic of Korea on May 8, 2014, all of which are hereby expressly incorporated by reference into the present application.

TECHNICAL FIELD

The present invention relates to a battery pack including a noise reduction member.

BACKGROUND ART

In recent years, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery pack having a plurality of battery cells electrically connected to one another because high output and large capacity are necessary for the middle or large-sized devices. In order to provide output and capacity required by a predetermined apparatus or device, a plurality of battery cells or battery modules may be connected in series to each other.

In a case in which the above-described battery pack is mounted in a electric vehicle in a state in which the battery pack is connected to an inverter, overall output of the battery pack may be unstable due to noise generated from the inverter.

Specifically, a noise current occurs when the inverter converts an alternating current from the battery pack to a direct current through fast switching. The noise current affects an output terminal of an external input and output terminal by conduction through a power line connecting the inverter and the external input and output terminal of the battery pack, or by induction through electron induction or electrostatic induction or etc. This deteriorates the stability of the output of the battery pack, in other words, the output fluctuates.

DISCLOSURE

Technical Problem

Therefore, the present invention has been made to solve the above problems, and other technical problems that have yet to be resolved.

Specifically, it is an object of the present invention to provide a battery pack configured such that, in a case in which the battery pack is used in a state in which the battery pack is mounted in a vehicle, it is possible to prevent the output of the battery pack from being interfered with due to noise generated from an inverter connected to the battery pack, thereby improving stability in output of the battery pack, and it is possible to prevent a worker from being exposed to high voltage during assembly or repair of the battery pack.

Technical Solution

In accordance with one aspect of the present invention, the above and other objects can be accomplished by the provision of a battery pack comprising:
a pack housing;
a base plate;
at least two battery modules arranged such that the battery modules are located in a space defined between the pack housing and the base plate, each battery module including a plurality of battery cells or unit modules which can be charged and discharged;
a first wall located at a first side of the base plate;
a second wall located at a second side of the base plate;
an external input terminal and an external output terminal are located at both of the first wall and the second wall, the battery modules being connected to the external input and output terminals in a state in which the battery modules are electrically connected in series or in parallel to each other; and
a capacitor is present at the first or second wall adjacent to a corresponding one of the external input and output terminals, the capacitor being electrically connected to said corresponding one of the external input and output terminals.

The capacitor may be grounded to the base plate via the first or second wall.

The first wall may be a front outer wall and the first side may be a front of the base, and the second wall may be a rear outer wall and the second side may be a rear of the base.

The capacitor may be a typical capacitor that blocks a direct current while allowing an alternating current. Accordingly, the capacitor may reduce a noise current.

In the battery pack according to the present invention, as described above, the capacitors are electrically connected to the external input and output terminals and are grounded to the base plate via the first or the second walls. In a case in which the battery pack is used in a state in which the battery pack is mounted in a vehicle, therefore, it is possible to prevent the output of the battery pack from being interfered with due to noise generated from an inverter connected to the battery pack, thereby improving stability in output of the battery pack, and it is possible to prevent a worker from being exposed to high voltage during assembly or repair of the battery pack.

A battery disconnect unit (BDU) may be mounted between the battery modules and the rear outer wall and the battery modules may be electrically connected to the external input and output terminals at the rear outer wall via the BDU. Specifically, the battery modules may be electrically connected to the BDU and the BDU may distribute electricity collected from the battery modules to the external input and output terminals located at the front outer wall and the rear outer wall.

The BDU may be electrically connected to the external input and output terminals at the rear outer wall via bus bars or wires and the capacitors may be electrically connected to the bus bars or the wires.

The battery pack according to claim 1, further comprising another capacitor present at the other of the first or second wall adjacent to a corresponding another of the external input and output terminals, said another capacitor being electrically connected to said corresponding another of the external input and output terminals.

In a concrete example of the present invention, a connector may be formed at an outside of the respective the first or the second walls such that the connector protrudes outward from the first or the second wall, the corresponding external input and output terminal may protrude inward from inside of the first or the second in a state in which the external input and output terminal is electrically connected to the connector, a capacitor receiving part may be located at one side of each of corresponding external input and output terminal, the capacitor may be mounted in the capacitor receiving parts. The insides of the first or the second walls mean sides of the first or the second walls located at the interior of the battery pack in which the battery modules are mounted and the outsides of the first or the second walls mean sides of the first or the second walls located at the outside of the battery pack.

The capacitor receiving part may be mounted at the first or the second walls by bolts and nuts.

Specifically, the capacitor may include a first capacitor and a second capacitor, the first capacitor may be electrically connected to a cathode terminal of the corresponding one of the external input and output terminals, and the second capacitor may be electrically connected to an anode terminal of the corresponding one of the external input and output terminals.

The first capacitor and the second capacitor may be grounded in a state in which the first capacitor and the second capacitor are electrically connected to each other. In assembly of the battery pack, therefore, a process of grounding the capacitors to the base plate via the outer walls may be simplified.

Specifically, the base plate may be provided with a conduction part, to which the first capacitor and the second capacitor are grounded, and the first capacitor and the second capacitor may be grounded to a chassis of a vehicle, in which the battery pack is mounted, via the conduction part. The conduction part may be formed by not applying an insulative coating to a portion of the base plate.

In a concrete example of the present invention, the battery pack may further include a sensing assembly mounted at upper ends of the battery modules to detect voltage of the battery modules, a pair of tension bars mounted at the upper ends of the battery modules, the tension bars extending in a direction in which the battery modules are arranged to support the battery modules, a pair of end plates mounted at outsides of outermost ones of the battery modules in a state in which the end plates are adjacent to the outsides of the outermost ones of the battery modules, and a battery management system (BMS) mounted at one side of one of the end plates, wherein the arranged battery modules may be loaded on the base plate and an outer edge of the pack housing may be coupled to the base plate and the front and rear outer walls in a state in which the pack housing surrounds the battery modules and the BMS.

Each of the battery cells may be configured to have a structure in which an electrode assembly is mounted in a battery case made of a laminate sheet including a metal layer and a resin layer and an outer edge of the battery case is sealed. The laminate sheet may include an outer resin layer exhibiting high durability, a metal blocking layer, and a resin sealant layer exhibiting a high thermal bonding property. The resin sealant layer may be thermally bonded.

It is required for the outer resin layer to exhibit high resistance against external environment. For this reason, it is necessary for the outer resin layer to exhibit more than predetermined tensile strength and weather resistance. To this end, the outer resin layer may be made of a polymer resin, such as polyethylene terephthalate (PET) or oriented nylon film. However, the present invention is not limited thereto.

It is required for the metal blocking layer to have a function to improve strength of the battery case in addition to a function to prevent introduction or leakage of foreign matter, such as gas or moisture. To this end, the metal blocking layer may be made of, for example, aluminum.

The resin sealant layer may be made of a polyolefin resin which exhibits a high thermal bonding property (thermal adhesive property) and a low hygroscopic property, which is necessary to restrain permeation of an electrolyte, and is not expanded or is not corroded by the electrolyte. In a concrete example, resin sealant layer may be made of cast polypropylene (CPP).

Each of the battery cells may be mounted in a battery cartridge configured to have a frame structure. In a concrete example, the cartridge may include at least a pair of plate-shaped frames to fix an outer edge of a corresponding battery cell in a state in which at least one of opposite main surfaces of battery cell is exposed.

The battery pack may further include a middle plate mounted between the innermost ones of the battery modules.

Specifically, in a case in which the battery pack according to the present invention is mounted in any one selected from among an electric vehicle, a hybrid electric vehicle, and a plug-in hybrid electric vehicle, the battery pack may be located in a space defined between a driver's seat and a seat next to the driver's seat. As a result, the battery pack may be mounted through a side crash beam of the vehicle in which the battery pack is mounted. In order to support the cut side crash beam, a middle plate including a crash beam abutting on the side crash beam may be mounted in the battery pack.

Each of the battery modules may be configured to have a rectangular structure and the battery modules may be loaded on the base plate such that the battery modules laterally abut each other in a state in which the battery modules are erected such that electrode terminals face tops of the battery modules.

Specifically, each of the battery modules may be configured to have a structure in which a height of each of the battery modules is greater than a width of each of the battery modules in the erected state. The width of each of the battery modules, i.e. the length of each of the battery modules in a direction in which the battery cells are arranged such that the battery cells are joined to each other at an interface between the respective battery cells, may be equivalent to 50% to 80% the height of each of the battery modules.

In addition, the battery pack may further include a top spacer disposed in a space defined between an inner surface of the pack housing and outer surfaces of the battery modules to restrain motion of upper end parts of the battery modules.

Specifically, each of the capacitors may have an allowable voltage of 0 to 1000 V DC. If the voltage of each of the capacitors is higher than 1000 V DC, it is not possible to properly remove noise generated from the inverter.

Each of the battery cells may be a lithium secondary battery. Specifically, each of the battery cells may be a lithium ion battery or a lithium ion polymer battery.

In accordance with another aspect of the present invention, there is provided a device including the battery pack with the above-stated construction as a power source.

Specifically, the device may be any one selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

The structure and manufacturing method of the device are well known in the art to which the present invention pertains and, therefore, a detailed description thereof will be omitted.

Effects of the Invention

As is apparent from the above description, in the battery pack according to the present invention, the capacitors are electrically connected to the external input and output terminals and are grounded to the base plate via the front and rear outer walls. In a case in which the battery pack is used in a state in which the battery pack is mounted in a vehicle, therefore, it is possible to prevent the output of the battery pack from being interfered with due to noise generated from an inverter connected to the battery pack, thereby improving stability in output of the battery pack, and it is possible to prevent a worker from being exposed to high voltage during assembly or repair of the battery pack.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery module according to an embodiment of the present invention;

FIG. 2 is an exploded view of the battery module of FIG. 1;

FIG. 3 is a perspective view showing a battery module and a hold down bracket according to an embodiment of the present invention;

FIG. 4 is a perspective view showing a battery pack according to an embodiment of the present invention;

FIG. 5 is a perspective view showing the battery pack from which a pack housing of FIG. 4 is removed;

FIG. 6 is a side view showing the battery pack of FIG. 5;

FIG. 7 is a front view showing a rear outer wall of the battery pack of FIG. 4 when viewed from the inside of the battery pack;

FIG. 8 is a perspective view showing the rear outer wall of the battery pack of

FIG. 4; and

FIG. 9 is a circuit diagram showing a battery pack according to an embodiment of the present invention;

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

FIG. 1 is a perspective view showing a battery module according to an embodiment of the present invention, FIG. 2 is an exploded view of the battery module of FIG. 1, and FIG. 3 is a perspective view showing a battery module and a hold down bracket according to an embodiment of the present invention;

Referring to FIG. 1 and FIG. 2, a battery module 110 includes a battery cell 10, a cartridge 20, a cooling member 30, a buffer member 40, an insulation member 50, an end plate 60, a bus bar assembly 80, and a cooling manifold 90.

The battery cell 10 is configured to have a structure in which an electrode assembly is mounted in a battery case made of a laminate sheet including a metal layer and a resin layer and an outer edge of the battery case is sealed. And the battery cell 10 is provided with a positive electrode terminal 11 and a negative electrode terminal 12 being formed on the one side in a collinear state.

The central portion of the cartridge 20 is provided with a battery cell receiving part 22 to mount the battery cells 10, and two battery cells 10 are mounted to a front side and a back side, respectively, of the battery cell receiving part 22 in a state in which the cooling member 30 is disposed between the two battery cells 10.

A plurality of the cartridge 20 in which the battery cells 10 and the cooling member 30 are mounted are arranged such that the battery cells 10 laterally abut each other. The buffer member 40 is mounted to the outermost battery cells 10. The insulation member 50 is added to the buffer member 40. Finally, the end plate 60 is mounted on the insulation member 50.

The cartridge 20, the insulation member 50, and the endplate 60 are provided with coupling holes 21, 51, 61 at their four corners, respectively. The cartridge 20, the insulation member 50, and the endplate 60 constituting the battery module 110 are configured to have a structure in which each of coupling bolt 70 is inserted through the coupling holes 21, 51, 61, and then the cartridge 20, the insulation member 50, and the endplate 60 are coupled and fixed.

The sensing assembly 80 is mounted on the upper of the battery cells 10 connected as described above. The sensing assembly 80 connects the battery cells 10 in series and/or parallel and, performs a function in which an electric flow cuts off in case of a malfunction of the battery module 110, by detecting voltage of the battery cells 10 and having safety elements.

The cooling manifold 90 is mounted to the lower part of the battery cell 10. The cooling manifold 90 is connected to the cooling conduit 31 of the cooling members 30, and make a coolant flow through the cooling conduit 31.

Referring to FIG. 3, a plurality of the battery modules 110 are mounted on the base plate 120 such that the battery modules 110 laterally abut each other, and fixed by the hold down bracket 180 as a fixing member. Specifically, the hold down bracket 180 presses the lower protruding part 111 (FIG. 1) of the battery module 110. The hold down bracket 110 is configured to be fixed to the base plate 120 by using bolts and nuts.

FIG. 4 is a perspective view showing a battery pack according to an embodiment of the present invention, FIG. 5 is a perspective view showing the battery pack from which a pack housing of FIG. 4 is removed, FIG. 6 is a side view showing the battery pack of FIG. 5, FIG. 7 is a front view showing a rear outer wall of the battery pack of FIG. 4 when viewed from the inside of the battery pack, and FIG. 8 is a perspective view showing the rear outer wall of the battery pack of FIG. 4.

Referring to FIGS. 1 to 4, a battery pack 100 includes a plurality of battery modules 110, a base plate 120, a sensing assembly (not shown), tension bars (not shown), a front outer wall 130, a rear outer wall 140, a battery management system (BMS) 150, a battery disconnect unit (BDU) 190, a pack housing 160, and a top spacer 170.

The battery modules 110 are arranged on the base plate 120 in a state in which the battery modules 110 laterally abut on each other. A middle plate 101 is mounted at the middle of the battery modules 110.

The front outer wall 130 and the rear outer wall 140 are located at the front and the rear of the base plate 120, respectively. The front outer wall 130 and the rear outer wall 140 are provided with external input and output terminals 131 and 141, respectively.

The battery modules 110 are connected to the BDU 190 in a state in which the battery modules 110 are electrically connected in series or in parallel to each other. The BDU 190 is electrically connected to the external input and output terminals 131 and 141 formed at the front outer wall 130 and the rear outer wall 140, respectively, via bus bars.

The sensing assembly is mounted at the upper ends of the battery modules 110 for sensing voltage of the battery modules 110. At opposite ends of the sensing assembly, the tension bars are mounted at the upper ends of the battery modules 110 in a direction in which the battery modules 110 are arranged for supporting the battery modules 110.

The BMS 150 is mounted at the outside of the outermost one of the battery modules 110 in a state in which the BMS 150 is adjacent to the outermost one of the battery modules 110. The lower end of the pack housing 160 is coupled to the base plate 120 in a state in which the pack housing 160 surrounds the battery modules 110 and the BMS 150. The pack housing 160 and the base plate 120 are coupled to each other by bolts and nuts (not shown).

The top spacer 170 is disposed in a space defined between the inner surface of the pack housing 160 and the upper end surfaces of the battery modules 110.

Each of the battery modules 110 is configured to have a rectangular structure. A height H of each of the battery modules 110 is greater than a width W of each of the battery modules 110. Specifically, the W of each of the battery modules 110 is equivalent to about 60% the height H of each of the battery modules 110.

A connector 142 is formed at the outside of the rear outer wall 140 such that the connector 142 protrudes outward from the rear outer wall 140. The external input and output terminal 141 protrudes inward from the inside of the rear outer wall 140 in a state in which the external input and output terminal 141 is electrically connected to the connector 142. A capacitor receiving part 143 is located at one side of the external input and output terminal 141. A first capacitor 144 and a second capacitor 145 are mounted in the capacitor receiving part 143.

The first capacitor 144 is electrically connected to a cathode terminal 146 of the external input and output terminal 141 and the second capacitor 145 is electrically connected to an anode terminal 147 of the external input and output terminal 141.

The first capacitor 144 and the second capacitor 145 are grounded to the base plate 120 via the rear outer wall 140 in a state in which the first capacitor 144 and the second capacitor 145 are electrically connected to each other. In addition, the first capacitor 144 and the second capacitor 145 are grounded to a chassis of a vehicle (not shown), in which the battery pack is mounted, via a conduction part (not shown) formed at the base plate 120.

FIG. 9 is a circuit diagram showing a battery pack according to an embodiment of the present invention.

Referring to FIG. 9, the noise (indicated as a dotted line with an arrowhead) generated from the inverter 200 connected to the external input and output terminal 141 affects the stability of the output of the battery pack since the noise is transmitted to the output terminal of the external input and output terminal through a power line, or electron induction or electrostatic induction or etc.

To address the aforementioned technical problem, Y-capacitor has a structure in which the first capacitor 144 is connected to the positive electrode 146 of the external input and output terminal 141 and is grounded to the base plate 120 and the second capacitor 145 is connected to the negative electrode 147 of the external input and output terminal 141 and is grounded to the base plate 120.

Since the Y-capacitor blocks a direct current while allowing an alternating current, the Y-capacitor causes the noise generated from the inverter to flow to the base plate grounded, and the noise flows to the chassis (not shown) being grounded to the base plate 120.

As aforementioned above, in the battery pack according to the present invention, the Y-capacitors are electrically connected to the external input and output terminals and are grounded to the base plate and the chassis. Therefore, it is possible to prevent the output of the battery pack from being interfered with due to noise generated from the inverter connected to the battery pack, thereby improving stability in output of the battery pack, and it is possible to prevent a worker from being exposed to high voltage during assembly or repair of the battery pack.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A battery pack comprising:
a pack housing;
a base plate;
at least two battery modules arranged such that the battery modules are located in a space defined between the pack housing and the base plate, each battery module including a plurality of battery cells or unit modules which can be charged and discharged;
a first wall located at a first side of the base plate;
a second wall located at a second side of the base plate;
a first external input and output terminal located at the second wall for allowing an electrical connection through the second wall, the battery modules being connected to the first external input and output terminal in a state in which the battery modules are electrically connected in series or in parallel to each other; and
a capacitor at the second wall adjacent to the first external input and output terminal, the capacitor being electrically connected to the first external input and output terminal and a ground,
wherein the capacitor comprises a first capacitor and a second capacitor, the first capacitor is electrically connected to a cathode terminal of the first external input and output terminal, and the second capacitor is electrically connected to an anode terminal of the first external input and output terminal, and
wherein the base plate is provided with a conduction part, to which the first capacitor and the second capacitor are grounded, and the first capacitor and the second capacitor are grounded to a chassis of a vehicle, in which the battery pack is mounted, via the conduction part.

2. The battery pack according to claim 1, wherein the capacitor is grounded to the base plate via the second wall.

3. The battery pack according to claim 1, wherein the first wall is a front outer wall and the first side is a front of the base, and
wherein the second wall is a rear outer wall and the second side is a rear of the base.

4. The battery pack according to claim 3, wherein a battery disconnect unit (BDU) is mounted between the battery modules and the second wall, and the battery modules are electrically connected to the first external input and output terminal at the second wall via the BDU.

5. The battery pack according to claim 4, wherein the BDU is electrically connected to the first external input and output terminal at the rear outer wall via bus bars or wires.

6. The battery pack according to claim 5, wherein the capacitor is electrically connected to the bus bars or the wires.

7. The battery pack according to claim 1, further comprising a third capacitor present at the first wall adjacent to a second external input and output terminal, said third capacitor being electrically connected to the second external input and output terminal.

8. The battery pack according to claim 1, wherein a connector is formed at an outside of the second wall such that the connector protrudes outward from the second wall,
wherein the first external input and output terminal protrudes inward from the inside of the second wall in a state in which the first external input and output terminal is electrically connected to the connector, and
wherein a capacitor receiving part is located at one side of the first external input and output terminal, and the capacitor is mounted in the capacitor receiving parts.

9. The battery pack according to claim 8, wherein the capacitor receiving part is mounted at the second wall by bolts and nuts.

10. The battery pack according to claim 1, wherein the first capacitor and the second capacitor are grounded in a state in which the first capacitor and the second capacitor are electrically connected to each other.

11. The battery pack according to claim 1, further comprising:
a sensing assembly mounted at upper ends of the battery modules to detect voltage of the battery modules;
a pair of tension bars mounted at the upper ends of the battery modules, the tension bars extending in a direction in which the battery modules are arranged to support the battery modules;
a pair of end plates mounted at outsides of outermost ones of the battery modules in a state in which the end plates are adjacent to the outsides of the outermost ones of the battery modules; and
a battery management system (BMS) mounted at one side of one of the end plates,
wherein the arranged battery modules are loaded on the base plate, and an outer edge of the pack housing is coupled to the base plate and the front and rear outer walls in a state in which the pack housing surrounds the battery modules and the BMS.

12. The battery pack according to claim 1, wherein each of the battery cells is configured to have a structure in which an electrode assembly is mounted in a battery case made of a laminate sheet comprising a metal layer and a resin layer and an outer edge of the battery case is sealed.

13. The battery pack according to claim 1, wherein each of the battery cells is mounted in a battery cartridge.

14. The battery pack according to claim 13, wherein the cartridge comprises at least a pair of plate-shaped frames to fix an outer edge of a corresponding battery cell in a state in which at least one of opposite main surfaces of the corresponding battery cell is exposed.

15. The battery pack according to claim 1, further comprising a middle plate mounted between innermost ones of the battery modules.

16. The battery pack according to claim 1, wherein each of the battery modules is configured to have a rectangular structure, and the battery modules are loaded on the base plate such that the battery modules laterally abut each other in a state in which the battery modules are erected such that electrode terminals face tops of the battery modules.

17. The battery pack according to claim 16, wherein each of the battery modules is configured to have a structure in which a height of each of the battery modules is greater than a width of each of the battery modules in the erected state.

18. The battery pack according to claim 1, further comprising a top spacer disposed in a space defined between an inner surface of the pack housing and outer surfaces of the battery modules to restrain motion of upper end parts of the battery modules.

19. The battery pack according to claim 1, wherein each of the capacitors has an allowable voltage of 0 to 1000 V DC.

20. The battery pack according to claim 1, wherein each of the battery cells is a lithium secondary battery.

21. A device comprising a battery pack according to claim 1 as a power source.

* * * * *